United States Patent [19]
Clapp et al.

[11] 3,822,724
[45] July 9, 1974

[54] FAST ACTING DISC VALVE

[75] Inventors: John M. Clapp, Sayre; Lewis C. Pritchard, Athens, both of Pa.

[73] Assignee: Ingersoll-Rand Company, Woodcliff Lake, N.J.

[22] Filed: Mar. 14, 1973

[21] Appl. No.: 341,118

[52] U.S. Cl............ 137/625.5, 137/612.1, 251/75, 251/77
[51] Int. Cl........................................... F16k 31/06
[58] Field of Search ............ 251/77, 75; 137/612.1, 137/625.5

[56] References Cited
UNITED STATES PATENTS

| | | | |
|---|---|---|---|
| 2,829,837 | 4/1958 | Willcox | 251/77 X |
| 2,942,622 | 6/1960 | Hahn et al. | 137/625.5 |
| 3,092,145 | 6/1963 | Brinkel | 251/77 X |

*Primary Examiner*—Arnold Rosenthal
*Attorney, Agent, or Firm*—David W. Tibbott

[57] ABSTRACT

A small fast acting solenoid operated disc valve having a free fluid accelerated disc triggered by a solenoid plunger in response to an over voltage D.C. short duration pulse. The resulting valve is suitable for torque control purposes and the like requiring valve closing times in the order of 5 milliseconds and small size.

9 Claims, 4 Drawing Figures

PATENTED JUL 9 1974 3,822,724

3,822,724

FAST ACTING DISC VALVE

BACKGROUND OF THE INVENTION

In the past, valves having response time in the order of 5 milliseconds or less have been of the destructive membrane type requiring replacement of the sealing element after each use. The fastest commercially available valves known to the inventor presently have response time in excess of 10 milliseconds. It is desirable to have a valve with as fast a response time as possible for commercial application such as torque control or to control rotation of a fastener. It is also desirable that the valve be as small as possible and resetable without replacement of parts or disassembly.

SUMMARY OF INVENTION

The object of this invention is to provide a small fast acting valve for interrupting the flow of pressure fluid in response to a signal. In the case of the preferred embodiment shown, the valve is operated by a solenoid plunger which responds to a relatively high voltage D.C. short duration pulse. The valve is suitable for use as a torque control device or other similar service requiring a rapid response.

The principal features of the invention include minimum inertial components and a disc sealing member which is propelled by the pressure fluid at a rate exceeding that of the activating plunger once displacement is accomplished to a substantial degree.

A further object of the invention is to provide a valve having a disc sealing member held in place in the first or normal operating condition by means of a resilient urging means such as a spring in combination with a differential pressure across a first valve seat that acts as a holding means due to the differential pressure on the disc between inlet and outlet across the valve seat. In this manner the disc can be reliably retained in the first condition with a minimum of spring pressure. The spring pressure resists the advance of the disc to the second or shut off position and is undesirable.

In general, these objects are met in a valve for interrupting the flow of pressure fluid comprising:
a valve body having a central bore, a pressure fluid inlet entering said bore, a first pressure fluid outlet from said bore, a first valve seat interposed between said first pressure fluid outlet and said inlet, a second pressure fluid outlet from said bore, a second valve seat interposed between said second pressure fluid outlet and said inlet, a sealing means which cooperates with either of the valve seats to form a closure, the sealing means being urged against the first valve seat in the first operating position by an urging means such as a spring and in the alternative displaced towards the second valve seat by an abutting non-coupled operating means such that the sealing means is propelled towards the second valve seat by pressure fluid substantially free of the influence of the operating means once movement has been initiated.

DESCRIPTION OF PREFERRED EMBODIMENT

Figure 2:
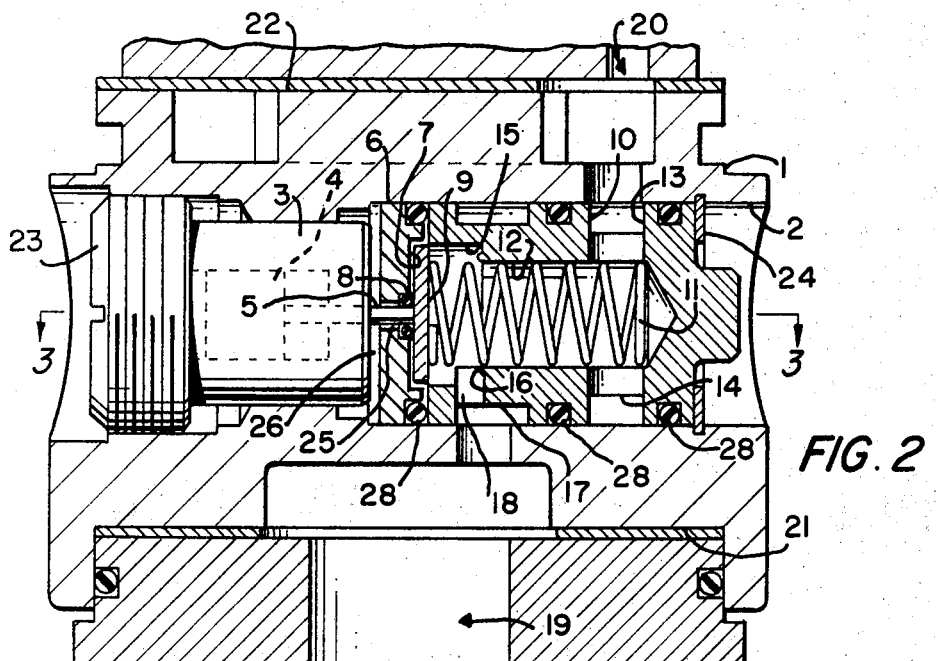
FIG. 2 is an enlarged section of the valve taken along line 2—2.
Figure 1:
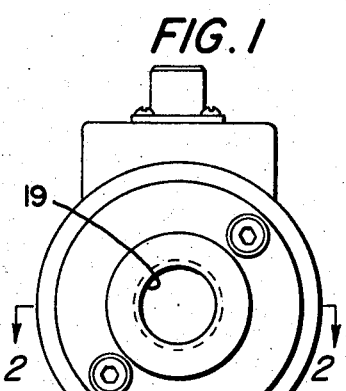
FIG. 1 is an elevation view of the valve assembly.
Figure 3:
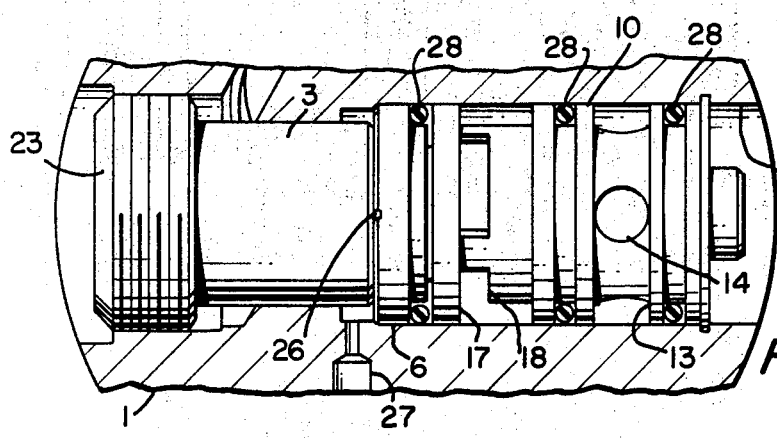
FIG. 3 is a section of the valve taken along line 3—3 with certain parts shown in elevation.

The operation and description of the invention in the form of the preferred embodiment shown in the drawings may best be understood by referring to FIG. 2 for general assembly and for operation of the related parts. The valve body 1 has a central cylindrical bore 2 into which are inserted at one end solenoid 3 having an armature 4 with a plunger 5 extending towards the center of the bore 2 through washer 6 which contains first valve seat 7 and sealing O-ring 8 on which disc 9 is seated. Inserted in the other end of the central cylindrical bore 2 is a spool member 10 which contains spring 11 in the spool bore 12.

The spool member 10 has an exhaust groove 13 cut about the circumference of its cylindrical face. Spool bore 12 and the exhaust groove 13 are in communication with each other via four circular exhaust ports 14 spaced at 90° intervals. The end of the spool member 10 towards the center of bore 2 has a recess 15 provided with a second valve seat ring 16. Surrounding recess 15 is an inlet groove 17 cut about the circumference of the cylindrical face of spool member 10. Recess 15 and inlet groove 17 are in communication with each other via four rectangular inlet ports 18 spaced at 90° intervals.

Pressure fluid enters the valve body via inlet 19 and exhausts via outlet 20. Valve faces 21 and 22 are designed to receive appropriate bolt on adapter plates for various inlet and outlet configurations. Solenoid 3 is retained in the central bore 2 by means of a threaded cap 23 and spool member 10 is retained in place by retaining ring 24.

Pressure fluid is exhausted from below the first valve seat 7 via the anular passage 25 around plunger 5, the washer groove passage 26 and valve body passage 27. Inlet groove 17 and exhaust groove 18 and the various other pressure differential areas are isolated from each other by means of suitable sealing O-rings 28.

In operation pressure fluid enters inlet 19 and proceeds via inlet groove 17 and inlet ports 18 into recess 15. Assuming the first or normal operating mode with the disc 9 seated on first valve seat 7 the pressure fluid then proceeds past second valve seat ring 16 into spool bore 12 and exhausts through circular exhaust ports 14 into exhaust groove 13 and finally out of the valve body 1 via outlet 20.

To shut off flow to outlet 20 an over voltage short duration D.C. pulse is impressed on solenoid 3 which causes armature 4 to advance rapidly towards the center of cylindrical bore 2. The armature 4 pushes plunger 5 against disc 9 causing it to move away from first valve seat 7. Once the disc 9 moves away inlet pressure begins to work on the under side of the disc assisting it towards second valve seat ring 16 against the relatively small force of spring 11. As disc 9 approaches second valve seat ring 16 it becomes unbalanced with higher fluid pressure on the bottom than on top and thus being a small mass out accelerates the armature 4 and plunger 5 contributing to a very fast closing in the order of 5 milliseconds or less.

To reset the valve to the first or normal operating mode it is necessary to shut off the pressure fluid and exhaust it. Spring 11 then resets disc 9 against first valve seat 7 and sealing O-ring 8. Pressure fluid is then restored. Disc 9 is held in place by the combination of force from spring 11 and pressure differential developed across the area of first valve seat 7 when disc 9 is in place. The pressure differential results from the difference in pressure between the pressure fluid and atmosphere because the area below valve seat 7 is exhausted to atmosphere as described above. It is desirable to limit the force exerted by spring 11 to that which is necessary to return disc 9 to the first valve seat 7 when the pressure fluid is turned off. This force may be minimized if disc 9 once returned is reliably held in position by other means. It is for this reason that first valve seat 7 was provided and the space below it vented to atmosphere as described above. The total holding force on the disc should be limited to that required to reliably hold the disc in place and no more since the solenoid 3 must overcome this force to activate the valve. The proper holding force is obtained by design sizing of the sealed area of first valve seat 7. The amount of venting is limited to minimize pressure fluid escape when the valve is activated to the shut off position.

Figure 4:
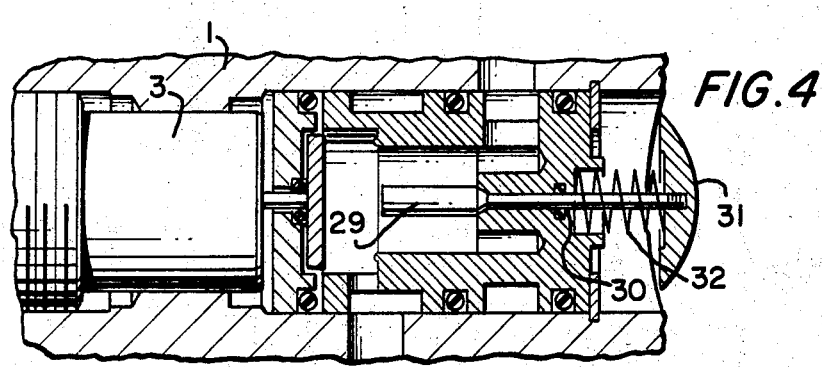
FIG. 4 is a view similar to FIG. 2 showing an alternative embodiment having an external reset means.

As shown in the FIG. 4 alternative preferred embodiment it is possible to return the disc 9 to the first valve seat 7 without shutting off the pressure fluid supply if a second plunger means 29 is inserted above the disc extending through the spool bore 12 and a sealed bushing 30 at the top of the bore. The plunger 29 may be activated by any means 31 including manual, electrical, pneumatic, hydraulic or other means sufficiently strong enough to overcome the pressure fluid acting over the area of the second valve seat ring. The plunger is shown in its retracted position. The disc return spring 11 may be eliminated in this case. The plunger 29 may be retracted out of the way by any suitable means including an external spring 32 as shown. A burst of higher pressure fluid under first valve seat 7, instead of plunger 5, may also be utilized to initiate disc movement to close such a valve. Where a plunger reset means is provided the function of the urging spring means 11 may be reversed especially in high pressure applications.

Although the preferred embodiments of the invention have been shown and described, it should be understood that the invention is not limited thereto, except by the scope of the claims. Various modifications and changes can be made without departing from the scope and spirit of the invention as the same will now be understood by these skilled in the art.

I claim:

1. A valve for interrupting the flow of pressure fluid comprising:

a valve body having a central bore, a pressure fluid inlet entering said bore, a first pressure fluid outlet from said bore, a first valve seat interposed between said first pressure fluid outlet and said inlet, a second pressure fluid outlet from said bore, a second valve seat interposed between said second pressure fluid outlet and said inlet, a sealing means which cooperates alternatively with either of said valve seats to form a closure thereof, said sealing means being urged to said first valve seat in the first operating position by an urging means and in the alternative displaced towards said second valve seat by an abutting non-coupled operating means such that said sealing means is propelled towards said second valve seat by pressure fluid entering said bore through said first inlet substantially free of the influence of said operating means once movement has been initiated, said first outlet communicating with the atmosphere and being restricted to allow a bleed flow of pressure fluid to relieve pressure build up behind said valve seat in the first operating position and a minimum escape of pressure fluid in the alternative position.

2. A valve according to claim 1 wherein:
said sealing means comprises a disc and said valve seats receive and are covered by said disc to form a closure of said pressure fluid outlets.

3. A valve according to claim 1 wherein:
said urging means comprises a spring and said operating means comprises an electrically operated solenoid plunger.

4. A valve according to claim 1 wherein:
the size of the flow passage through said first valve seat is selected in combination with said urging means to assure said sealing member remains seated against said first valve seat in the first operating position, the sealing force on said sealing member being the sum of the force exerted by said urging means and the differential pressure between said inlet and said first outlet acting over the area of said first valve seat, said sealing force being the minimum sufficient to reliably seat said sealing member and thereby requiring a minimum force exerted by said operating means to displace said sealing member towards said second valve seat.

5. A valve according to claim 1 wherein:
said operating means comprises a mechanical plunger.

6. A valve according to claim 1 wherein:
said operating means comprises a pressure fluid activated means.

7. A valve according to claim 2 wherein:
said urging means incorporates reset means to return said sealing means to the first operating position without interruption of the flow of pressure fluid.

8. A valve according to claim 7 wherein:
said urging means assists said operating means in initiating movement towards said second valve seat, said sealing means being held against said first valve seat by pressure differential sufficient to overcome said urging means alone and reliably hold the disc.

9. A valve for interrupting the flow of pressure fluid comprising:

a valve body having a central bore; said central bore being adapted to receive an electrically operated solenoid plunger at one end and a spring at the other end and having interspaced between said plunger and said spring a first valve seat towards the plunger and a second valve seat towards the spring and disposed between said first and second valve seat a sealing member which cooperates with said first or second valve seat to selectively seal one end of said bore; said valve body is provided with a pressure fluid inlet communicating with said central bore between said first and second valve seat and a first pressure fluid outlet located to the plunger side of said first valve seat and a second pressure fluid outlet located to the spring side of said second valve seat;

wherein said spring resiliently urges said sealing member towards said first valve seat and retains said sealing member thereon with the aid of the differential pressure between said pressure fluid inlet and said first pressure fluid outlet; said first pressure fluid outlet is restricted to allow only a bleed flow behind said first valve seat; and said plunger abuttingly displaces said sealing member towards said second valve seat; said plunger not being attached to said sealing member permitting said sealing member to advance towards said second valve seat as a free fluid accelerated sealing member without restraint from said operating means once displaced to a point where the pressure fluid can act on the first valve seat side of the sealing member.

* * * * *